United States Patent [19]

Carlisle

[11] Patent Number: 5,468,404
[45] Date of Patent: Nov. 21, 1995

[54] LUBRICATING OIL ADDITIVES, THEIR PREPARATION AND USE

[75] Inventor: William D. Carlisle, Hull, England

[73] Assignee: BP Chemicals (Additives) Limited, London, United Kingdom

[21] Appl. No.: 227,703

[22] Filed: Apr. 14, 1994

Related U.S. Application Data

[63] Continuation of Ser. No. 49,618, Apr. 16, 1993, abandoned, which is a continuation of Ser. No. 674,656, Mar. 25, 1991, abandoned.

[30] Foreign Application Priority Data

Mar. 31, 1990 [GB] United Kingdom .................. 90/07313
Dec. 21, 1990 [GB] United Kingdom .................. 90/27825

[51] Int. Cl.$^6$ ..................... C10M 149/12; C10M 149/22
[52] U.S. Cl. ................................. 252/51.5 R; 252/51.5 A; 252/50; 549/551; 548/520
[58] Field of Search ......................... 252/51.5 R, 51.5 A, 252/50; 549/551; 548/520; C10M 133/56, 149/14, 149/22

[56] References Cited

U.S. PATENT DOCUMENTS

| | | | |
|---|---|---|---|
| 5,053,150 | 10/1991 | Emert et al. | 252/51.5 R |
| 5,085,788 | 2/1992 | Emert et al. | 252/51.5 R |
| 5,091,574 | 2/1992 | Lin et al. | 549/551 |

FOREIGN PATENT DOCUMENTS 03173535  5/1989  European Pat. Off. .

*Primary Examiner*—Stephen Kalafut
*Assistant Examiner*—Alan D. Diamond
*Attorney, Agent, or Firm*—Brooks Haidt Haffner & Delahunty

[57] ABSTRACT

A lubricating oil soluble compound suitable for use as a dispersant additive is obtainable by reacting at elevated temperature a polyepoxide with a dispersant having at least one reactive nitrogen-containing moiety. Intermediates of the general formula IV

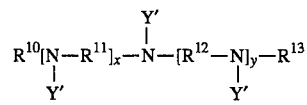

where Y' is a group derived from the reaction of the polyepoxide with reactive nitrogen-containing moieties (i.e. primary or secondary amines) are novel.

The process for preparing the lubricating oil soluble compounds comprises at least 2 sequential steps.

Lubricating oil compositions comprises a major proportion of lubricating oil and a minor proportion of the lubricating oil soluble compounds.

7 Claims, 3 Drawing Sheets

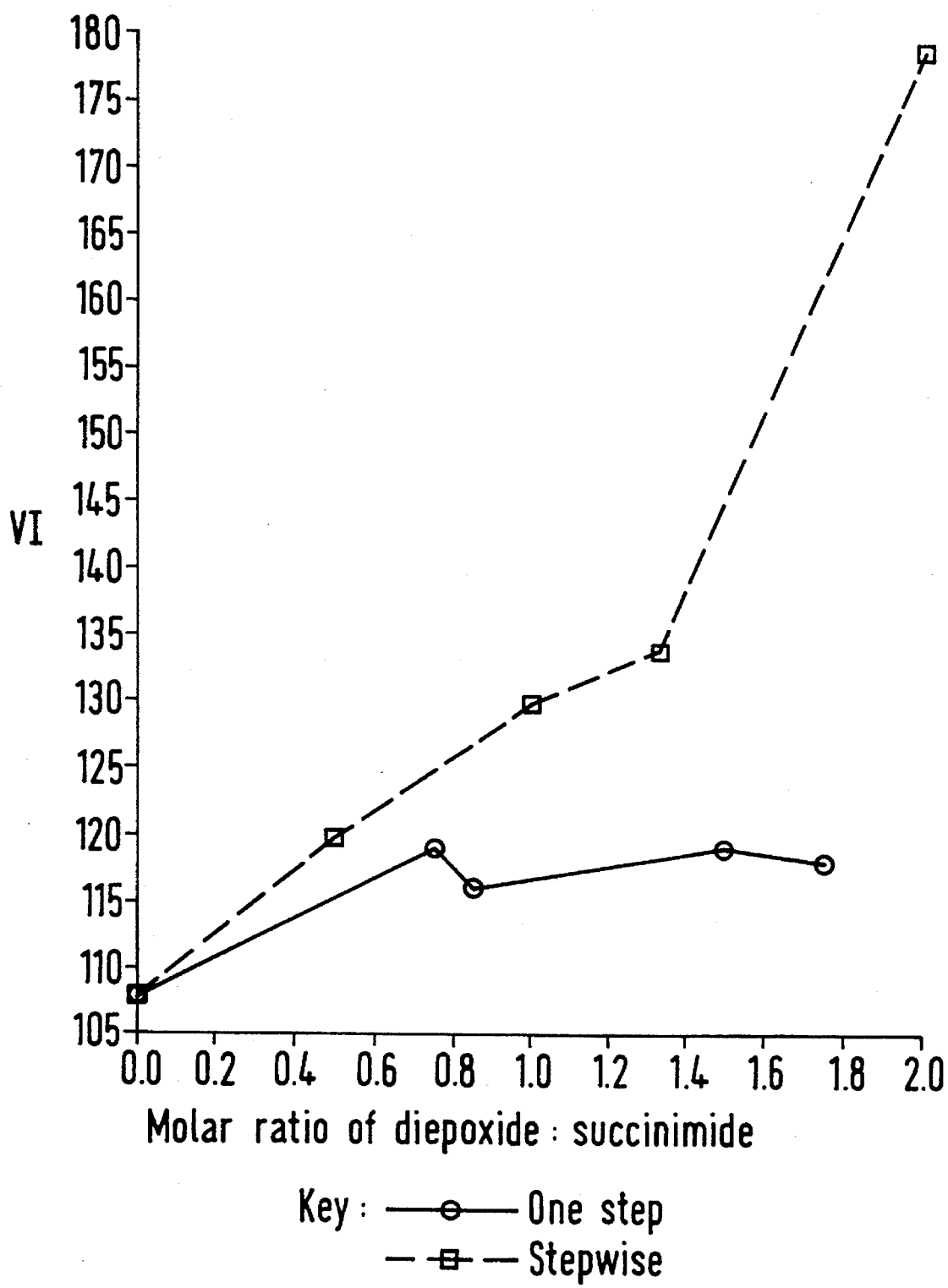

LUBRICATING OIL ADDITIVES, THEIR PREPARATION AND USE

This application is a continuation of application Ser. No. 08/049,618, filed Apr. 16, 1993 now abandoned, which is a continuation, of application Ser. No. 07/674,656, filed Mar. 25, 1991 now abandoned.

The present invention relates generally to oil soluble dispersant additives which are comprised of the reaction product of a dispersant having at least one reactive nitrogen-containing moiety and a polyepoxide, processes for their preparation and to concentrate compositions and finished lubricating oil compositions containing the aforesaid oil soluble dispersant additives.

The reaction of mono-epoxides with dispersants to attach hydroxyalkyl residues thereto and thereby improve their dispersancy properties has been described in for example U.S. Pat. Nos. 3,373,111 and 4,798,612. Typically, U.S. Pat. No. 3,373,111 discloses a process for preparing oil-soluble, nitrogen-containing compositions by treating an acylated amine with at least 0.2 equivalent of an organic epoxide at a temperature within the range from about 50° C. to the decomposition temperature, said acylated amine being prepared by reacting at a temperature above about 80° C. an alkylene amine with from about 0.2 to 2 equivalents of an acid-producing compound selected from the class consisting of (a) substituted succinic acids having the structural formula:

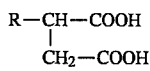

wherein R is a hydrocarbon radical having at least about 50 aliphatic carbon atoms, (b) monocarboxylic acids having the structural formula:

wherein $R^1$ is a branched-chain hydrocarbon radical having from about 12 to about 50 aliphatic carbon atoms in the principal chain and at least one aliphatic substituent aryl pendant group, (c) mixtures of succinic acids of (a) and monocarboxylic acids selected from the class consisting of the monocarboxylic acids of (b) and aliphatic monocarboxylic acids having from about 12 to about 50 carbon atoms, and (d) the esters and anhydrides of said acids.

The reaction of polyepoxides with dispersants to produce dispersants having enhanced low temperature viscometric properties is also known from EP-A-0317353. Disclosed therein is an oil soluble dispersant useful as an oleaginous composition additive comprising the reaction products of:

(1) at least one nitrogen or ester containing adduct selected from the group consisting of (i) oil soluble salts, amides, imides, oxazolines, esters, or mixtures thereof of long chain hydrocarbyl substituted mono- and dicarboxylic acids or their anhydrides, (ii) long chain hydrocarbons having a polyamine attached directly thereto, and (iii) Mannich condensation product formed by condensing a long chain hydrocarbyl substituted hydroxy aromatic compound with an aldehyde and a polyalkylene polyamine, said adduct containing at least one reactive group selected from reactive amino groups and reactive hydroxyl groups; and (2) at least one polyepoxide.

Preferred polyepoxides for use in the reaction are said to be the diepoxides, ie those containing two oxirane rings. The polyepoxides are reacted with the acylated nitrogen derivatives of hydrocarbyl substituted dicarboxylic acids in a single step reaction.

We have found that improved dispersants having desirable viscosity index improver properties result when aliphatic polyepoxides are reacted with a dispersant having at least one reactive nitrogen—containing moiety in at least two sequential steps.

Accordingly the present invention provides an oil soluble dispersant additive which is comprised of the reaction product of an aliphatic polyepoxide and a dispersant having at least one reactive nitrogen—containing moiety characterised in that the reaction of the dispersant having at least one reactive nitrogen—containing moiety with the polyepoxide is accomplished in at least two sequential steps.

Any dispersant having at least one reactive nitrogen-containing moiety may be employed. Thus dispersants having primary and/or secondary amino groups may be employed but not those containing exclusively tertiary amino groups. Dispersants having at least 2 reactive nitrogens are preferred, more preferably they contain 3 to 7 such nitrogens. It is believed, though we do not wish to be bound by any theory, that reaction is between the reactive nitrogens of the dispersant and the oxirane ring of the polyepoxide to open the oxirane rings in a manner whereby different molecules of the dispersant are cross-linked by the polyepoxide molecules.

Any dispersant having at least one reactive nitrogen—containing moiety may be employed. Suitable dispersants include (i) oil-soluble amides of imides of long chain hydrocarbyl-substituted mono- and dicarboxylic acids or their anhydrides, (ii) long chain hydrocarbons having a polyamide attached directly thereto, and (iii) Mannich condensation products formed by condensing a long chain hydrocarbyl—substituted hydroxy aromatic compound, for example an alkyl phenol, with an aldehyde and a polyalkene polyamine, which adduct contains at least one reactive amino group.

The dispersant is preferably an imide or amide formed by the reaction of a polyalkene substituted succinic acylating agent and an amine.

Succinimides are a well-known class of dispersant. Typical of the art relating to such materials is GB-A-1565627 and the prior art acknowledged therein. Typically, they are prepared by reacting a polyalkene, in the presence or absence of chlorine, with either maleic acid, or preferably maleic anhydride, to produce a polyalkene-substituted succinic acid or anhydride and thereafter reacting the polyalkene-substituted succinic acid or anhydride with a nitrogen material, suitably an amine, which may be a mono-, di- or polyamine.

A suitable succinimide has the formula:

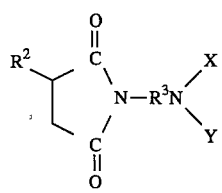

(I)

wherein $R^2$ is a hydrocarbyl group, typically a polyolefin group; $R^2$ preferably contains between 30 and 300 carbon atoms, more preferably between 50 and 150 and $R^3$ is a divalent group such that $H_2NR^3NXY$ is an alkylene amine, such as an ethylene or propylene amine, eg $R^3$ is —$(CH_2CH_2NH)_kCH_2CH_2$ where k is zero or an integer from 1 to 7 preferably 2 to 6, alternatively a mixed ethylene/propylene amine, e.g. $H_2N(CH_2)_3NH(CH_2)_2NH(CH_2)_3NH_2$ can be used. X and Y are independently either hydrogen, alkyl, or hydroxy alkyls, each of 1–6 carbons eg methyl ethyl or hydroxyethyl or together form the group:

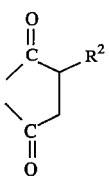
(II)

Alternatively, $R^3$ in the formula (I) may be a divalent group such that $H_2NR^3NXY$ is an alkanolamine or polyether amine. Typically, such alkanolamines may contain the group $=N.CH_2CH_2NH.CH_2CH_2OH$ (i.e. $R^3=CH_2CH_2$, $X=H$, $Y=CH_2CH_2OH$) and typically such polyether amines may contain the group $=NCH_2CH_2OCH_2CH_2.OHC_2CH_2NH_2$ (i.e. $R^3=(CH_2CH_2O)_2CH_2CH_2$, $X=Y=H$). Useful commercially available polyether amines are the Jeffamines (RTM) marketed by Texaco. $R^3$ is preferably an alkylene group of 2 to 40 carbons, optionally interrupted with at least one O or NH group and in particular contains one or more units of alkylene ether or alkylene amino groups each of 2–4 carbons.

$R^3$ may also be a divalent group such that $H_2NR^3NXY$ is an aromatic or araliphatic amine eg of 6–20 carbons, such as phenylene or biphenylene diamine or bis (amino benzyl).

Suitably in the formula (I) $R^2$ is derived from either ethylene, propylene, 1-butene, isobutene, 1-hexane, 1-octene and the like. Alternatively, the polyalkene may be derived from an internal olefin, e.g. 2-butene, or an interpolymer, eg an ethylene/propylene copolymer. Preferably the polyalkene is a polyisobutene.

The succinimide may be either a mono- or bis-succinimide.

For the purposes of this invention the term polyepoxide is taken to mean a compound comprising at least 2 oxirane rings.

The polyepoxides suitable for use in the process of the invention are aliphatic. Preferred polyepoxides contain up to four oxirane rings. More preferred are diepoxides, ie containing two oxirane rings per molecule. Examples of suitable aliphatic polyepoxides are described in the aforesaid EP-A-0 317 353. Suitably the diepoxides may be those of the formula:

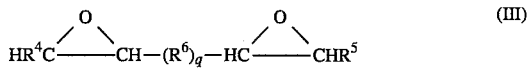
(III)

where q=0 or 1, $R^6$ is a divalent aliphatic hydrocarbyl or heterosubstituted aliphatic hydrocarbyl group, for example an alkylene, cycloalkylene eg of 5–10 carbons, or alkenylene group eg of 2–20 carbons, $R^6$ can optionally contain up to 3 oxirane rings. $R^4$ and $R^5$ are independently either hydrogen or aliphatic hydrocarbyl groups, for example alkyl or alkenyl groups, preferably alkyl groups. When $R^4$ or $R^5$ is a hydrocarbyl group it is preferably a $C_1$ to $C_6$, more preferably a $C_1$ to $C_3$ group for example methyl or ethyl. It is preferred that $R^4$ and $R^5$ are independently hydrogen or a methyl group.

When $R^6$ is an alkylene group, eg of 1–300 carbons, it is suitably of the formula $-[CHR_b]_r$ where $R_b$ is hydrogen or a $C_1$–$C_{20}$ preferably $C_1$–$C_6$, more preferably methyl or ethyl; r is an integer from 1 to 30 eg 1–8, preferably 1 to 6. Each of the group $-[CHR_b]$ can be the same or different. The group $R^6$ is suitably derived from a polyolefin e.g. polyethylene.

When $R^6$ is a hetero group, an eg O—substituted aliphatic hydrocarbyl group, the polyepoxide will typically be prepared by reaction of a diol (e.g. 1,4 butanediol, 2,2 dimethyl 1,3 propane diol) or a glycol (e.g. polyethylene, polypropylene or polybutene glycols) with epichlorohydrin or the corresponding dichloride with glycidol.

Examples of suitable diepoxides are 1,4 butane diol diglycidyl ether, (BDBB) 1,6 hexane diol diglycidyl ether, polypropylene oxide diglycidyl ether, 2,2 dimethyl 1,3 propane diol diglycidyl ether (neopentenyl diglycidyl ether).

Many aliphatic diepoxides suitable for use in the present invention are available commercially.

$R^6$ can also be an alkylene or alkylene glycol group optionally substituted with at least one, e.g. 1–4, group D of the formula

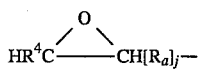

where $R_a$ is an alkylene groups eg of 1–4 carbons such as $CH_2$ or alkylene glycol group eg of 2–40 carbons and at least 2 oxygens; $R^4$ is as defined above j is zero or 1.

Examples of suitable polyepoxides having an $R^6$ group as defined above are glycerol triglycidyl ether and pentaerythritol tetraglycidyl ether.

It is believed that cross-linking of the dispersant is accomplished in a manner which enhances the viscometric properties when reaction with the polyepoxide is effected in at least two sequential steps.

The reaction of the dispersant with the polyepoxide may suitably comprise in a first step reacting dispersant at elevated temperature with polyepoxide, and in a further step or steps reacting the product from the preceding step or steps at elevated temperature with further dispersant.

It will be appreciated that in the subsequent sequential step or steps involving the addition of further dispersant, a different dispersant or dispersants to that used in the first step may be employed.

The reaction of the dispersant with the polyepoxide of the present invention is accomplished in two sequential steps. Suitably, for example (i) dispersant and polyepoxide are mixed at a temperature in the range from ambient to 120° C. (ii) the temperature of the mixture is then adjusted, if necessary, to a value above 70° C. and below the decomposition temperature of the components of the mixture for a period, for example, from 10 to 180 minutes, (iii) the mixture is maintained at this temperature for a period of, for example, from 15 to 300 minutes, (iv) a further portion of dispersant is mixed with the product of (iii) at a temperature in the range from 15° to 220° C., (v) the temperature of the mixture is then adjusted, if necessary, to a value in the range from 70° to 250° C. and (vi) the mixture is maintained at this temperature for a period of, for example, 15 to 300 minutes.

As regards the amounts of dispersant and polyepoxide to be employed, suitably 0.75 to 1.1, more preferably 0.8 to 0.95, equialents of polyepoxide, are generally used for each amino hydrogen present in the dispersant in the first step. Thereafter, in a sequential step or steps, from 0.5 to 15, preferably from 1.0 to 10.0, equivalents of dispersant per equivalent of dispersant used in the first step are added.

In a preferred embodiment of the present invention, a proportion of the dispersant is reacted with polyepoxide in two portions; in a first step (i) the first portion of dispersant is reacted with a polyepoxide, the product of this first step (i) being subsequently reacted in a second step (ii) with a compound (A) having at least two amino hydrogens. Reaction of the second portion of the dispersant can be effected at the same time as reaction of compound (A) with the product of the aforementioned first step (i); in this case compound (A) and the second portion of the dispersant can suitably be blended prior to reaction. Alternatively, in a particularly preferred embodiment reaction of the second portion of dispersant can be effected after reaction of compound (A) with the product of the aforementioned first step (i). In this latter case the process comprises at least 3 steps.

Compound (A) is suitably of a lower molecular weight than the dispersant. Typically the molecular weight of compound (A) is in the range 32–1,000.

The amino hydrogens of compound (A) may be bonded to the same nitrogen atom (as in for example

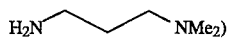

or may be bonded to two (or more) different nitrogen atoms (as in for example

Compound (A) may be a polyamide; alternatively compound (A) may be an amine-terminated polyalkylene glycol (the polyalkylene glycol may be amine terminated at one end e.g.

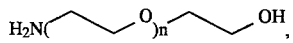

or amine-terminated at both ends e.g.

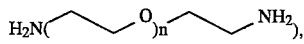

an alcoholamine e.g.

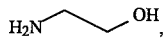

a polyoxyalkylene amine e.g.

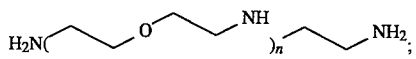

in each case n=1 to 20 preferably 1 to 10 more preferably 1 to 4. The amine— terminated polyalkylene glycol, alcoholamine and polyoxy alkylene amine may be derived from ethylene oxide, propylene oxide or mixed oxides.

Alternatively compound (A) can be a monoamine provided that the amine is a primary amine e.g. $H_2N(CH_2)_5CH_3$. Compound (A) is preferably a diamine e.g. ethylene diamine dimethyl amino propylamine, a triamine or a tetramine e.g. tris(amino ethyl) amine, or a polyoxyalkylene amine containing a primary amino group attached to the terminus of a polyether backbone where the polyether backbone is based on propylene oxide, ethylene oxide or mixed propylene/ethylene oxides.

Products of step (i) comprise a novel compound of the general formula

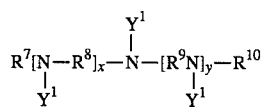

wherein $R^8$ and $R^9$ are independently a divalent aliphatic, hetero-substituted aliphatic, aromatic or hetero-substituted aromatic group, eg as defined by $R^3$ and with any aromatic groups containing 6–20 carbons, Rhu 7and $R^{10}$ are independently a hydrocarbyl group, or

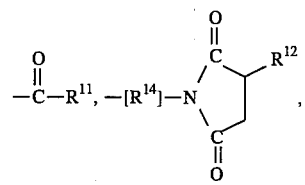

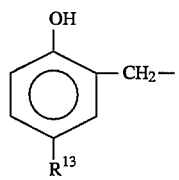

or the grup $Y^1$.

$Y^1$ is

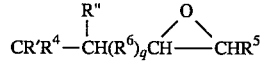

where one of R' and R" is hydrogen and the other is a hydroxyl group, wherein $R^{11}$, $R^{12}$ and $R^{13}$ are independently a monovalent aliphatic or hetero eg 0— substituted aliphatic group, eg as defined for $R^3$, $R^{14}$ is an alkylene or hetero (eg 0)—substituted alkylene group.

$R^6$ is a divalent aliphatic or hetero (eg 0)—substituted aliphatic group optionally comprising up to 2 oxirane rings, or as further described for $R^6$ above, $R^4$ and $R^5$ are independently hydrogen or a hydrocarbyl group as defined hereinabove, and x, and y are independently zero or an integer from 1 to 10 q is zero or 1, each $R^8$ group, each $R^9$ group and each $Y^1$ group can be the same or different.

$R^8$ and $R^9$ are independently a divalent aliphatic, hetero-substituted aliphatic, aromatic or hetero substituted aromatic group. Where $R^8$ or $R^9$ is an aliphatic group eg hydrocarbyl of 1–300 carbons it is suitably of the formula $[CHR^{15}]_m$ where $R^{15}$ is hydrogen or a $C_1$–$C_{20}$ preferably $C_1$–$C_{10}$ alkyl group more preferably methyl or ethyl, m is an integer from 1 to 12 preferably 2 to 6, each of the m groups —$[CHR^{15}]$— can be the same of different; the group $R^8$ and $R^9$ are suitably derived from an olefin. Where $R^8$ or $R^9$ is a hetero-substituted aliphatic group it is preferably an oxygen-substituted aliphatic group e.g. alkylene oxide which can be suitably derived from an epoxide e.g. ethylene oxide, propylene oxide. Where $R^8$ or $R^9$ is an alkylene oxide it is suitably of the formula —$[CHR^{16}CHR^{17}O]_pCHR^{16}CHR^{17}$— where $R^{16}$ and $R^{17}$ are independently hydrogen or a $C_1$–$C_{25}$, preferably $C_1$–$C_{16}$ more preferably $C_1$–$C_6$ alkyl group for example methyl or ethyl. Preferably $R^{16}$ is hydrogen and $R^{17}$ is hydrogen, methyl or ethyl, p is 1 to 20, preferably from 1 to 4. Where $R^{17}$ is hydrogen, methyl or ethyl, the alkylene oxide will usually be derived from ethylene, propylene or butylene oxides respectively.

Where $R^7$ and/or $R^{10}$ is a hydrocarbyl group it is preferably an alkyl group having at least 50 carbon atoms. The alkyl group can be a polyolefin group derived from an olefin e.g. ethylene, propylene, 1-butene, isobutene, 1-hexane, 1-octene and the like.

Preferably the hydrocarbyl group is derived from polyisobutene.

The groups $R^{11}$, $R^{12}$ and $R^{13}$ are defined as for $R^7$ and $R^{10}$ above, when $R^7$ and $R^{10}$ are hydrocarbyl groups or can be alkyloxy alkyl.

Alternatively, $R^7$ and $R^{10}$ can independently be a group derived from a substituted succinimide i.e.

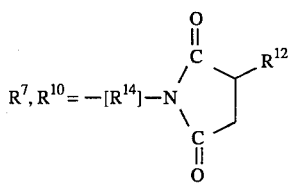

$R^{14}$ is as defined for the group $-[CHR^{15}]_m$, above; an amide

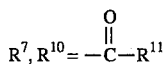

or a Mannich condensation product formed by condensing a hydrocarbyl substituted phenol with a aldehyde e.g. formaldehyde and a polyalkylene polyamine

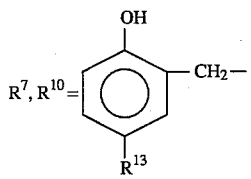

$R^7$ and $R^{10}$ can be the group $Y^1$ where $Y^1$ is

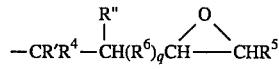

where one of R' and R" is hydrogen, the other is a hydroxyl group. $R^6$ is an aliphatic or hetero-substituted aliphatic group as defined hereinabove, $R^6$ can optionally comprise up to 3 oxirane rings. $R^4$ and $R^5$ are independently a hydrogen or an aliphatic hydrocarbyl group; where $R^4$ or $R^5$ is a hyrocarbyl group it is an alkyl, or alkenyl group preferably an alkyl group. Preferably the hydrocarbyl group is a $C_1$–$C_6$ more preferably $C_1$–$C_3$ alkyl group for example methyl or ethyl. It is preferred that $R^4$ and $R^5$ are independently hydrogen or methyl.

x and y are independently zero or an integer from 1 to 10; it is preferred that x+y is at least 1 preferably 2–6.

Q is zero or 1,

Where the product of step (i) is reacted with a low molecular weight amine as defined hereinabove (compound (A)) before the subsequent addition of the second portion of the dispersant, reaction of the dispersant and polyepoxide in step (i) is suitably carried out at a temperature in the range 60°–120° C. preferably 80°–100° C. for a period of time in the range 15 mins to 3 hr., preferably ½–1½ hours. Reaction of the low molecular weight amine with the product of step(i) is also carried out at a temperature in the range 60°–120° C., preferably 80°–100° C. for a period of time in the range 15 mins to 3 hr preferably ½–1½ hr.

Where compound (A) is added the number of moles of said compound (A) is suitably less than the number of moles of dispersant reacted in step (i) and is preferably in the range 0.1 to 0.95 preferably 0.2 to 0.7 per mole of dispersant reacted in step (i). Where compound (A) is added to the product of step (i), and a second portion of dispersant is reacted in a third step as described hereinabove, the second portion of dispersant is suitably reacted at a temperature in the range 70–250, preferably 100°–200° C. more preferably 130°–170° C., for a period between 1 and 6 hr, preferably 2–4 hrs. The second portion of dispersant in this case is added in such an amount that the ratio of moles of second portion of dispersant/moles of diepoxide added in step (i) is in the range of 0.5–8.0, preferably 1.0–4.0.

Products of step (ii) wherein the product of step (i) is reacted with compound A comprise a novel compound of the general formula.

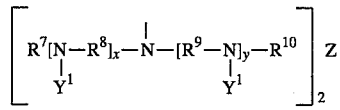

wherein

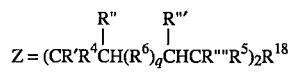

where one of R' and R" and one of R''' and R'''' is hydrogen and the other is a hydroxyl group, $R^4$, $R^5$, $R^6$, $R^7$, $R^8$, $R^9$, $R^{10}$, $Y^1$, x, y and q are all as defined hereinabove.

$R^{18}$ is a divalent radical derived from compound having 2 amino hydrogens by removal of said amino hydrogens.

The divalent radical is derived from the removal of 2 amino hydrogens from a compound (A) as defined hereinabove (for example $-N(CH_2)_5CH_3$ from $H_2N(CH_2)_5CH_3$).

The two (or more) step reaction is preferably carried out in a solvent for the reactants. Lubricating oils are preferred as solvents because (i) commercially available succinimides are generally marketed in the form of lubricating oil solutions and (ii) the intended use of the product of the reaction is as a lubricating oil additive. Both natural and synthetic lubricating oils may be employed. Suitably the lubricating oil may be a mineral oil, for example an SN150 oil. It is also possible to use an inert diluent if so desired. Suitable inert diluents include liquid hydrocarbons, for example xylene, toluene, or the like.

The product of the reaction carried out in a lubricating oil solvent is a concentrate composition containing the oil soluble dispersant additive.

An advantage of producing the dispersant composition in the manner aforesaid is that there is less possibility of the product being contaminated with residual chlorine, unlike alternative routes in which chlorine is employed as a reactant. In consequence the product is potentially more environmentally acceptable.

In another aspect, the present invention provides a lubricating oil composition which composition comprises a major proportion of a lubricating oil and a minor proportion of the dispersant additive of the present invention.

The lubricating oil may be any natural or synthetic lubricating oil.

Into the lubricating oil composition there may also be incorporated any of the conventional additives normally employed, which additives include antioxidants, detergents, extreme pressure/anti-wear agents and viscosity index improvers. It is an advantage of the present invention that, because the dispersant composition of the invention has viscosity index properties, less of the conventional viscosity index improver may be required.

The lubricating oil composition may be used for any lubricating application, including automotive and marine use.

For automotive use the lubricating oil composition may suitably contain up to 10% (eg 0.1 to 10% or 2–10%) by weight of the dispersant additive of the present invention.

For marine engine use the lubricating oil composition may suitably contain up to 10% (eg 0.1 to 10% or 2–10%) by weight of the dispersant additive of the present invention.

BRIEF DESCRIPTION OF THE DRAWINGS

The invention will now be illustrated by reference to the following Examples and Figures.

FIG. 3 is a plot of VI (Viscosity Index) of an 11% oil solution of succinimide derivative described in Example 9 and Comparison Test 2 as a function of the molar ratio of BDGE:succinimide.

Figure 1:
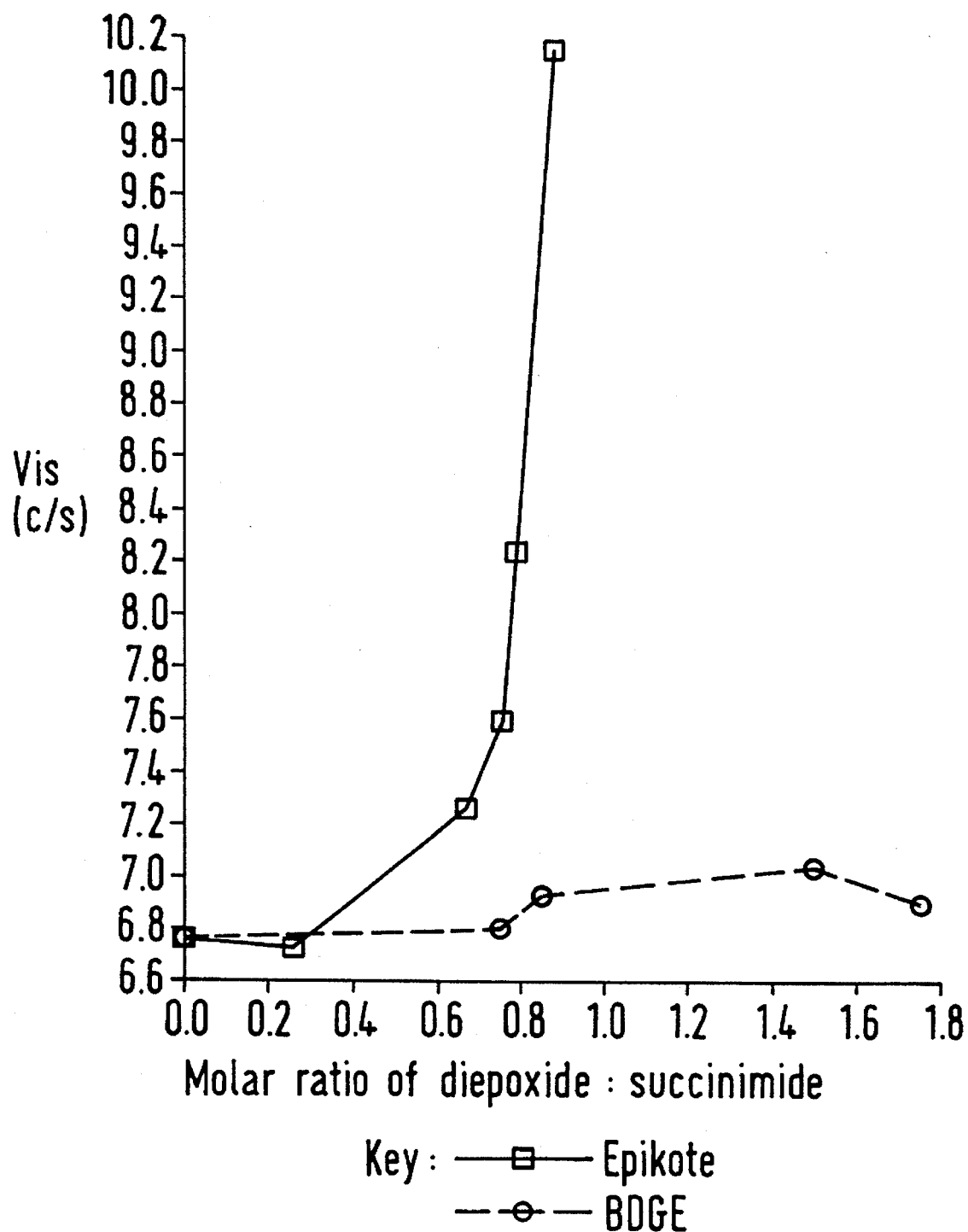
FIG. 1 is a plot of Viscosity of an 11% oil solution of succinimide derivatives described in Comparison Tests 1 and 2 at 100° C. as a function of the molar ratio of diepoxide to succinimide.

Examples 1–8 (according to the invention) are examples of where the reaction product of step i) is reacted with Compound (A) as defined hereinabove. Example 9 (according to the invention) is an example where no Compound (A) is added to the product of step (i).

In all the Examples there was used ADX201 (a commercially available succinimide dispersant) formed by the reaction of a polyisobutene ($M_n$ about 1000)—substituted succinic anhydride and tetraethylene penta-amine or ADX212 (a commercially available succinimide dispersant) produced by the reaction of a polyisobutene (Mn about 2,000)—substituted succinic anhydride and triethylene tetra amine. Where the term "succinimide" is used in the Examples and the figures, it refers to ADX201.

Method 1

Suitably a polyepoxide (suitably 0.75 or more, preferably 0.25 to 1.1, more preferably 0.8 to 0.95 equivalents of polyepoxide are generally used for each reactive N-H group present in the dispersant) is added to a dispersant derivative having at least one reactive nitrogen-containing moiety (that is primary or secondary amino nitrogen), at a temperature in the range from ambient to 120° C. The temperature of the mixture is then adjusted, if necessary, to a value from 60°–120° C. over a period of, for example 15 mins to 1 hr. The mixture is maintained at this temperature for a period of, for example 15 mins to 2 hr. A low molecular weight amine (preferably MW 31–1000) containing at least two reactive amino nitrogen (N-H) groups is added, at a temperature in the range from 15° C. to its boiling pint, to the mixture (in the range 0.1–0.95 molar equivalents, suitably 0.2 to 0.7 molar equivalents per mole of the dispersant added in step (i). The temperature is adjusted, if necessary, to between 60° C. and 120° C. The mixture is maintained at this temperature for a period of, for example, 15 mins to 3 hr. A further portion of dispersant derivative (not necessarily the same one as above; generally 0.5–8.0 molar equivalents, preferably 1.0–4.0 molar equivalents per mole of diepoxide added in step (i)) containing at least one reactive nitrogen group (N-H) is added to the mixture at a temperature in the range from 15° to 220° C. The temperature of the mixture is adjusted, if necessary, to a value in the range from 70° to 250° C. preferably 100°–200° C. and the mixture is maintained at this temperature for a period of, for example, 15 to 300 minutes preferably 1 h to 4 hrs.

EXAMPLE 1

Four molar equivalents of butanediol diglycidyl ether were added to 200 g of a 25% actives solution of ADX201 in SN150 oil at 20° C. The mixture was heated to 90° C. and stirred at this temperature for 1 hour. N,N-dimethyl-3-aminopropylamine (0.55 equivalents) were added to this mixture and it was stirred for a further 1 hour period at 90° C. A second portion (276 g) of a 50% actives solution of ADX201 in SN150 was added and the mixture was stirred at 150° C. for 4 hours.

EXAMPLE 2

Four molar equivalents of butanediol diglycidyl ether were added to 100 g of a 25% actives solution of ADX201 in SN150 oil at 20° C. The mixture was heated to 90° C. and stirred at this temperature for 1 hour. N,N-dimethyl-3-aminopropylamine (0.50 equivalents) were added to this mixture and it was stirred for a further 1 hour period at 90° C. A second portion (100 g) of a 73% actives solution of AXD201 in SN150 was added and the mixture was stirred at 150° C. for 4 hours.

Method 2

Suitably a polyepoxide (suitably 0.75 or more, preferably 0.75 to 1.1, more preferably 0.8 to 0.95 equivalents of polyepoxide are generally used for each reactive N-H group present in the dispersant) is added to a dispersant having at least one reactive nitrogen containing moiety, that is primary or secondary amino nitrogen, at a temperature in the range from ambient to 120° C. The temperature of the mixture is then adjusted, if necessary, to a value from 60° to 120° C. over a period of, for example 15 mins to 1 hr. The mixture is maintained at this temperature for a period of, for example 15 mins to 3 hr. A low molecular weight amine (mw (preferably MW 31–1000), in the range 0.1–0.95 molar equivalents, suitably 0.2 to 0.7 molar equivalents per mole of dispersant added in step (i) containing at least two reactive amino nitrogen (N-H) groups, is blended with a further portion of a dispersant derivative (not necessarily the same as above) consisting at least one reactive nitrogen containing moiety. This is then added to the intermediate at a temperature in the range from 15° to 220° C. The temperature of the mixture is adjusted, if necessary, to a value in the range from 70° to 250° C. preferably 100°–200° C. and the mixture is maintained at this temperature for a period of, for example, 15 to 300 minutes preferably 1h to 4 hrs.

EXAMPLE 3

Four molar equivalents of butanediol diglycidyl ether were added to a 50% solution of ADX201 in SN150 (100 g) at 20° C. The temperature was raised to 90° C. over 30 minutes and stirred at this temperature for 35 minutes. 246 g of a blend of dimethylaminopropylamine (4.4 g) in a 50% oil solution of ADX201 (250 g) was added and the reaction stirred at 120° C. for 1 hour.

EXAMPLE 4

Four molar equivalents of butanediol diglycidyl ether were added to a 50% solution of ADX201 in SN150 (100 g) at 20° C. The temperature was raised to 90° C. over 30 minutes and stirred at this temperature for 35 minutes. 243 g of a blend of dimethylaminopropylamine (8.9 g) in a 50% oil solution of ADX201 (250 g) was added and the reaction stirred at 120° C. for 1 hour.

EXAMPLE 5

Four molar equivalents of butanediol diglycidyl ether were added to a 50% solution of ADX201 in SN150 (100 g) at 20° C. The temperature was raised to 90° C. over 30 minutes and stirred at this temperature for 35 minutes. 242 g of a blend of dimethylaminopropylamine (4.3 g) in a 50% oil solution ADX212 (250 g) was added and the reaction stirred at 120° C. for 1 hour.

EXAMPLE 6

Four molar equivalents of butanediol diglycidyl ether were added to a 50% solution of ADX201 in SN150 (100 g) at 20° C. The temperature was raised to 90° C. over 30 minutes and stirred at this temperature for 35 minutes. 232 g of a blend of ethylenediamine (2.5 g) in a 50% oil solution of ADX201 (250 g) was added and the reaction stirred at 120° C. for 1 hour.

EXAMPLE 7

Six molar equivalents of butanediol diglycidyl ether were added to a 50% solution of ADX201 in SN150 (100 g) at 20° C. The temperature was raised to 90° C. over 30 minutes and stirred at this temperature for 35 minutes. 243.6 g of a blend of dimethylaminopropylamine (4.5 g) in a 50% oil solution of ADX201 (250 g) was added and the reaction stirred at 120° C. for 1 hour.

EXAMPLE 8

Six molar equivalents of butanediol diglycidyl ether were added to a 50% solution of ADX201 in SN150 (100 g) at 20° C. The temperature was raised to 90° C. over 30 minutes and stirred at this temperature for 30 minutes. 237 g of a blend of ethylenediamine (2.5 g) in a 50% oil solution of ADX201 (250 g) was added and the reaction stirred at 120° C. for 1 hour.

The viscosities at −20°, 40° and 100° C. for each of the products from Examples 1–8, the starting dispersants and a commercially available dispersant LS6420 are given in Table 1.

TABLE 1

| Dispersant | Actual Conc (%) | Actives Conc (%) | Viscosity −20° C. Poise | Viscosity 40° C. c/s | Viscosity 100° C. c/s | VI |
| --- | --- | --- | --- | --- | --- | --- |
| Lz6420 | — | 5.5 | 38.00 | 53.2 | 8.38 | 131 |
| ADX201 | — | 5.5 | 33.75 | 43.2 | 6.76 | 108 |
|  | — | 7.3 | 47.00 | 50.7 | 7.38 | 106 |
| ADX212 | — | 6.0 | 38.0 | 48.6 | 7.41 | 115 |
| Example 1 | 13.0 | 5.7 | 26.6 | 50.35 | 8.34 | 139 |
| Example 2 | 10.0 | 5.3 | 32.5 | 49.91 | 8.11 | 134 |
|  | 13.0 | 6.9 | 42.5 | 58.25 | 9.26 | 141 |
| Example 3 | 13.0 | 7.2 | 32.8 | 52.0 | 8.52 | 139 |
| Example 4 | 13.0 | 7.3 | 37.7 | 51.3 | 8.47 | 141 |
| Example 5 | 13.0 | 7.2 | 29.6 | 50.8 | 8.23 | 134 |
| Example 6 | 13.0 | 7.2 | 24.5 | 52.8 | 8.62 | 139 |
| Example 7 | 13.0 | 7.4 | 37.3 | 75.8 | 12.47 | 164 |
| Example 8 | 13.0 | 7.4 | 28.2 | 71.6 | 11.93 | 163 |

*'Actives conc.' refers to any material that is not mineral oil, ie the amount of succinimide + diepoxide present by weight.
**'Actual conc.' refers to % weight of end material (which contains oil already) diluted in oil.

In Comparison Test 1 there is used Epikote (RTM) 828. This has the formula:

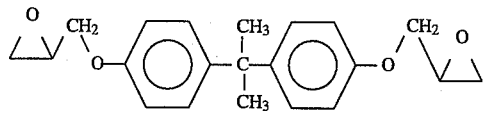

LZ6420 is a dispersant having VI credit marketed by Lubrizol. It is used hereinafter for comparison purposes.

COMPARISON TEST 1

Preparation of a dispersant additive by reacting a succinimide with an aromatic diepoxide in one step A 50% by weight solution of the succinimide in Solvent Neutral (SN)150 oil was heated to 125° C. A diepoxide (Epikote (RTM) 828) was added to the succinimide solution over 15 minutes and the resulting mixture was heated to 130° C. and maintained at this temperature for 90 minutes.

The reaction was performed over a range of molar ratios of diepoxide to succinimide. The viscosities of 11.0% by weight of product solutions at −20°, 40° and 100° C. were recorded. A graph of the viscosity at 100° C. as a function of the molar ratio of diepoxide to succinimide is provided in FIG. 1. The graph shows that the viscosity of the solution increases markedly at a molar ratio of diepoxide:succinimide in the range from about 0.7 to about 0.8, the maximum viscosity being observed at a molar ratio of about 0.8.

Molar ratios in excess of 0.8 generated gels which were insoluble in oil.

A comparison between the viscosities of one of the products (0.79 molar ratio) with the untreated succinimide starting material is shown in Table 2.

TABLE 2

| Temperature (°C.) | Viscosity of 11.0% solution of starting succinimide | Viscosity of 11.0% solution of 0.79 molar ratio derivative |
|---|---|---|
| −20 | 35.75 poise | 37.0 poise |
| 40 | 43.2 cSt | 50.97 cSt |
| 100 | 6.76 cSt | 8.24 cSt |

The figures in Table 2 show that whilst the −20° C. viscosity was relatively unaffected (3.5% increase), relatively the 100° C. viscosity was substantially (21.9%) increased.

COMPARISON TEST 2

Preparation of a dispersant additive by reacting a succinimide with an aliphatic diepoxide in one step A 50% solution of the succinimide in NS 150 oil was heated to 125° C. 1,4-Butanediol diglycidyl ether (BDGE) was added dropwise over a period of 40 minutes. The temperature of the reaction mixture was maintained at 125° C. for a further 60 minutes. The viscosity of a 11.0% solution of the succinimide product in SN 150 oil was recorded at 100° C.

The reaction was performed over a range of molar ratios of diepoxide to succinimide. The viscosities of the products were recorded on 11.0% solutions at 40° and 100° C.

Figure 2:
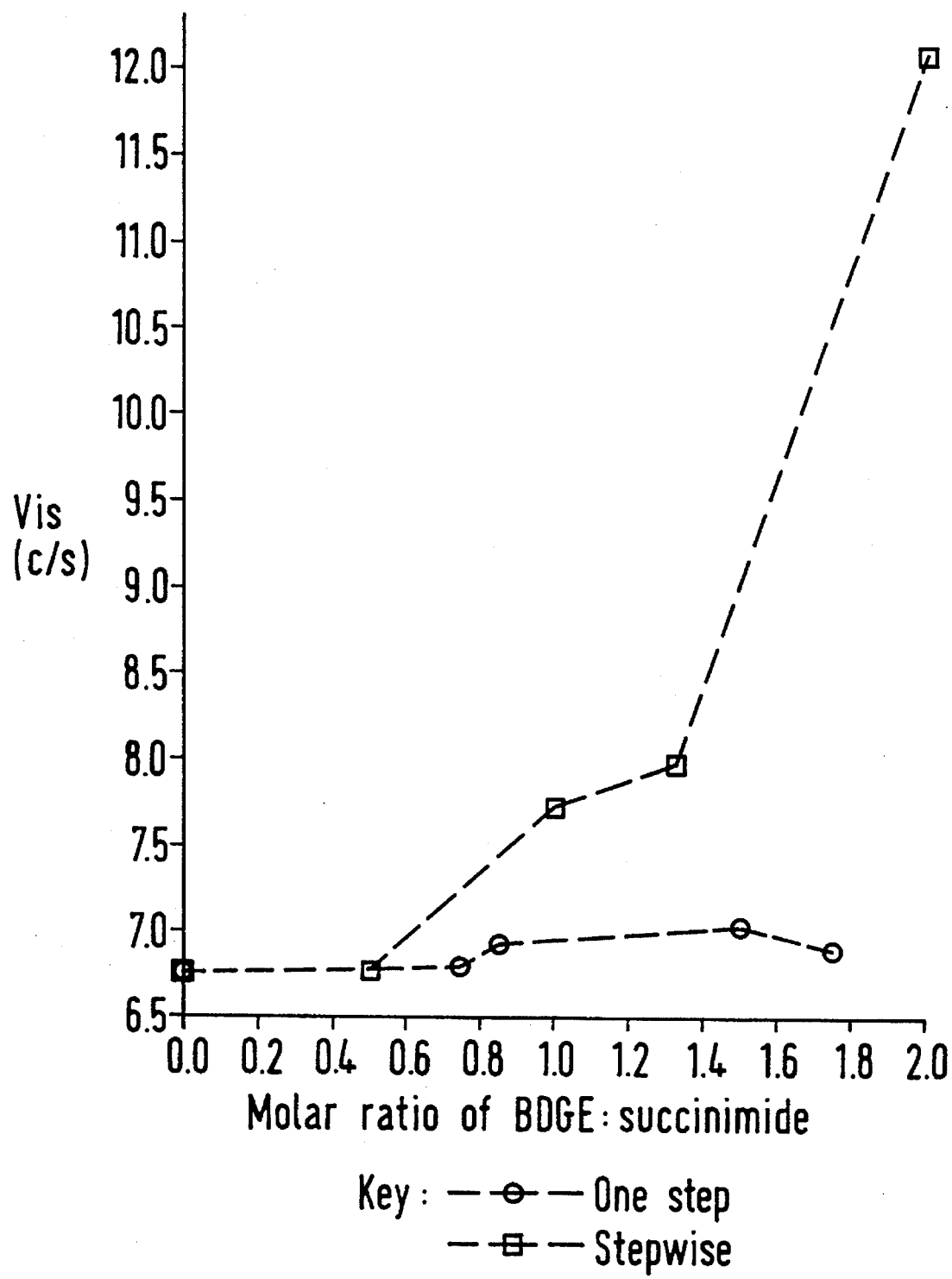
FIG. 2 is a plot of Viscosity of an 11% oil solution of succinimide derivative described in Example 9 and Comparison Test 2 at 100° C. as a function of the molar ratio of BDGE (1,4-butane diol diglycidyl ether) to succinimide.

A comparison between the viscosities of the products of 100° C. as a function of the molar ratio of diepoxide to succinimide is shown in FIG. 1 and in FIG. 2.

EXAMPLE 9

Preparation of a dispersant by reacting a succinimide with an aliphatic diepoxide in two sequential steps The succinimide was combined with four equivalents of 1,4-butanediol diglycidyl ether (BDGE) at ambient temperature. The mixture was heated to 90° C. over 30 minutes and maintained at this temperature for a further 30 minutes. A further portion of the succinimide at a temperature of 75° C. was then added. The temperature of the mixture was raised to 120° C. and held at this value for one hour. This reaction was carried out for a range of molar ratios of diepoxide.

A summary of the result from the one step (Comparison Test 2) and two-step (Example 9) reactions of succinimide with 1,4-butanediol diglycidyl ether is shown in Table 3. The differences between the viscosities of the products at 100° C. as 11.0% solutions is highlighted in FIG. 2. FIG. 3 contrasts the effect on the viscosity index of the product of increasing the ratio of the ailphatic diepoxide to the succinimide from Comparison Test2 and Example 9.

TABLE 3

| | ** Conc. of product (% b.w.) | Concn. of actives* present (% b.w.) | VISCOSITY −20° C. Poise | VISCOSITY 40° C. c/s | VISCOSITY 100° C. c/s | VI |
|---|---|---|---|---|---|---|
| LZ6420 | 11.0 | 5.5 | 38.00 | 53.2 | 8.38 | 131 |
| Succinimide | 11.0 | 5.5 | 35.75 | 43.2 | 6.76 | 108 |
| COMPARISON TEST 2 ONE STEP SUCCINIMIDE:BDGE | | | | | | |
| 1:0.75 | 11.0 | 5.8 | — | 41.7 | 6.80 | 119 |
| 1:0.85 | 11.0 | 5.9 | — | 43.5 | 6.93 | 116 |
| 1:1.50 | 11.0 | 6.1 | — | 43.5 | 7.04 | 119 |
| 1:1.75 | 11.0 | 6.2 | — | 42.9 | 6.90 | 118 |
| EXAMPLE 9 STEPWISE SUCCINIMIDE:BDGE:SUCCINIMIDE | | | | | | |
| 1:4:7 | 11.0 | 5.7 | 33.9 | 41.6 | 6.78 | 120 |
| 1:4:3 | 11.0 | 5.9 | 33.5 | 47.2 | 7.74 | 130 |
| | 13.0 | 7.0 | 38.0 | 52.2 | 8.45 | 135 |
| 1:4:2 | 11.0 | 6.1 | 34.7 | 48.9 | 8.00 | 134 |
| | 12.0 | 6.6 | 37.0 | 57.4 | 9.40 | 146 |
| 1:4:1 | 11.0 | 6.3 | 36.5 | 67.3 | 12.12 | 179 |

With reference to FIG. 3 it can be seen that by comparison with the two-step reaction little VI credit is obtained by the corresponding one-step reaction.

Thin Layer Chromatography (TLC) Dispersancy Test

This bench Test measures how far a dispersant can move a used oil.

The dispersants tested were (i) the succinimide reacted with Epikote (RTM) 828 (an aromatic diepoxide) in a molar ratio of 1:0.82 in a single step reaction (Comparison Test 1) and (ii) the succinimide reacted with BDGE (an aliphatic diepoxide) followed by further succinimide in a molar ratio of 1:4:3 in a two-step reaction (from Example 9). The succinimide itself was tested, as was also LZ6420.

The result of the Test are given in Table 4.

TABLE 4

| Material tested | % used oil moved | % used oil - total streak length (cm) |
|---|---|---|
| (i) Succinimide:Epikote 828 (1:0.82) | 36.6 | 100.0 |
| (ii) Succinimide:BDGE:Succinimide (1:4:3) | 83.4 | 91.8 |
| (iii) Succinimide | 92.5 | 92.2 |
| (iv) LZ6420 | 79.0 | 91.2 |
| PASS RATING | greater than 70.0 | greater than 85.0 |

According to the results reported in Table 4, the Test predicts the aromatic (one-step) product (i) to be a poor dispersant and in contrast the aliphatic (two-step) product (ii) to be a good one.

The aromatic (one-step) product (i) was rated in a Petter AVB engine test. It received an overall rating of 15, which is a bad fail (base oil rate=30, pass rating is greater than 60).

I claim:

1. A process for preparing an oil-soluble compound for use as a dispersant additive which comprises reacting an aliphatic polyepoxide with a dispersant having at least one reactive nitrogen-containing moiety and having amino hydrogen in a first step using in said first step an amount of at least 0.75 equivalents of polyepoxide to amino hydrogen present in the dispersant, and in a second step reacting the product of the first step with a compound (A) having a molecular weight lower than said first dispersant and having at least two amino hydrogens, a second portion of dispersant being added at the same time as, or subsequent to, reaction of compound (A) with the product of the first step.

2. A process as defined in claim 1, wherein said aliphatic polyepoxide is selected from the group consisting of 1,4-butane diol diglycidyl ether, 1.6-hexane diol diglycidyl ether, polypropylene oxide diglycidyl ether, and 2,2,dimethyl 1,3-propane diol diglycidyl ether.

3. A process as defined in claim 1, wherein said aliphatic polyepoxide is 1,4-butanediol diglycidyl ether.

4. A process as defined in claim 1, wherein compound A is N,N-dimethyl-3-amino propylamine.

5. A process as defined in claim 1, wherein compound (A) is a primary monoamine, a polyamine, an amine terminated polyalkylene glycol, an alcohol amine, or a polyoxyalkylene amine.

6. A process as claimed in claim 1 wherein said second portion of dispersant is added subsequent to the reaction of compound (A) with the product of the first step.

7. A process as claimed in claim 1 wherein compound (A) is a polyamine, an amine terminated polyalkylene glycol, an alcoholamine or a polyoxy alkylene amine.

* * * * *

UNITED STATES PATENT AND TRADEMARK OFFICE
CERTIFICATE OF CORRECTION

PATENT NO. : 5,468,404  
DATED : November 21, 1995  
INVENTOR(S) : WILLIAM D. CARLISLE It is certified that error appears in the above-indentified patent and that said Letters Patent is hereby corrected as shown below:

Col. 1, l. 37, formula should read "$R^1COOH$"

Col. 2, l. 6, there should be a comma (,) after "Accordingly,"

Col. 2, l. 30, correct the spelling of the word "polyami<u>n</u>e"

Col. 2, l. 46, correct the spelling of the word "nitrogen<u>ous</u>"

Col. 3, l. 17, formula should read ---$=NCH_2CH_2OCH_2CH_2.OCH_2CH_2NH_2$---.

Col. 3, l. 58, there should be a comma (,) after "group,"

Col. 4, l. 1, should read "hetero group, eg an 0-"

Col. 4, l. 43, there should be a comma (,) after "120°C.,"

Col. 5, l. 27, correct the spelling of the word "polyami<u>n</u>e"

Col. 3, l. 17, should read "$R^7$ and $R^{10}$".

Col. 6, l. 29, correct the spelling of the word "group"

Col. 7, l. 8, correct the spelling of the word "hex<u>e</u>ne"

Col. 7, l. 63, there should be a period (.) after "1<u>.</u>"

Col. 8, l. 2, there should be a comma (,) after "120°C.,"

Col. 8, l. 45, should read "(for example $=N(CH_2)_5$"

Col. 13, l. 64, should read "products <u>at</u>"

UNITED STATES PATENT AND TRADEMARK OFFICE
CERTIFICATE OF CORRECTION

PATENT NO. : 5,468,404
DATED : November 21, 1995
INVENTOR(S) : WILLIAM D. CARLISLE It is certified that error appears in the above-indentified patent and that said Letters Patent is hereby corrected as shown below:

Col. 14, l. 49, after Table 3, the following was omitted:
"*'Actives' refers to any material that is not mineral oil, ie the amount of succinimide + diepoxide present by weight."

** 'Conc. of product' refers to % weight of end material (which contains oil already diluted in oil."

Claim 2, line 3, should read "1,6-hexane"

Signed and Sealed this

Ninth Day of July, 1996

Attest:

BRUCE LEHMAN

Attesting Officer

Commissioner of Patents and Trademarks